(12) United States Patent
Tankala et al.

(10) Patent No.: US 8,998,458 B2
(45) Date of Patent: Apr. 7, 2015

(54) LED PLASTIC HEAT SINK AND METHOD FOR MAKING AND USING THE SAME

(75) Inventors: Triloka Chander Tankala, Chennai (IN); Venkatesha Narayanaswamy, Bangalore (IN); Arunachala Parameshwara, Bangalore (IN); Poovanna Theethira Kushalappa, Bangalore (IN); Seongnam Kang, Yongin-Si (KR)

(73) Assignee: Sabic Global Technologies B.V. (NL)

( * ) Notice: Subject to any disclaimer, the term of this patent is extended or adjusted under 35 U.S.C. 154(b) by 300 days.

(21) Appl. No.: 13/483,555

(22) Filed: May 30, 2012

(65) Prior Publication Data

US 2012/0307501 A1    Dec. 6, 2012

Related U.S. Application Data

(60) Provisional application No. 61/491,546, filed on May 31, 2011.

(51) Int. Cl.
*B60Q 1/06* (2006.01)
*F21V 29/00* (2006.01)
*F21K 99/00* (2010.01)
(Continued)

(52) U.S. Cl.
CPC ............. *F21V 29/262* (2013.01); *F21K 9/90* (2013.01); *F21V 29/22* (2013.01); *F21V 29/2231* (2013.01); *F21V 29/244* (2013.01); *F21S 48/1109* (2013.01); *F21S 48/115* (2013.01); *F21S 48/212* (2013.01); *F21S 48/215* (2013.01); *F21V 29/2293* (2013.01); *F21Y 2101/02* (2013.01); *F21S 48/328* (2013.01)

(58) Field of Classification Search
USPC ............ 362/294, 373; 361/704, 720; 165/185
See application file for complete search history.

(56) References Cited

U.S. PATENT DOCUMENTS

| 5,660,461 A | 8/1997 | Ignatius et al. |
| 7,898,811 B2 | 3/2011 | Storey |
| 2007/0121326 A1 | 5/2007 | Nall et al. |

(Continued)

FOREIGN PATENT DOCUMENTS

| CN | 201787401 U | 4/2011 |
| CN | 201795452 U | 4/2011 |

(Continued)

OTHER PUBLICATIONS

Korean Patent No. 102008079745(A); Publication Date: Sep. 2, 2008; Abstract Only; 1 Page.

(Continued)

*Primary Examiner* — Anh Mai
*Assistant Examiner* — Meghan Dunwiddie
(74) *Attorney, Agent, or Firm* — Cantor Colburn LLP

(57) ABSTRACT

In an embodiment, heat sink system can comprise: an integrally formed plastic heat sink and a printed circuit board package, wherein the plastic heat sink comprises a thermally conductive plastic having a thermal conductivity of at least 1.0 W/mK. In another embodiment, hybrid heat sink system, comprising: an integrally formed plastic heat sink and an insert, wherein the plastic heat sink comprises a thermally conductive plastic, the plastic heat sink and the insert each having a cylindrical shape, and wherein the insert comprises a feature of lancing provisions, corrugations, embossing, holes, or a combination comprising at least one of the foregoing features.

25 Claims, 8 Drawing Sheets

(51) Int. Cl.
*F21S 8/10* (2006.01)
*F21Y 101/02* (2006.01)

(56) References Cited

U.S. PATENT DOCUMENTS

| | | |
|---|---|---|
| 2008/0153959 A1 | 6/2008 | Charati et al. |
| 2009/0086492 A1* | 4/2009 | Meyer ............................ 362/294 |
| 2009/0180289 A1 | 7/2009 | Hsu |
| 2011/0030920 A1 | 2/2011 | Qin et al. |
| 2011/0095690 A1 | 4/2011 | Sagal |
| 2011/0101861 A1 | 5/2011 | Yoo |

FOREIGN PATENT DOCUMENTS

| | | |
|---|---|---|
| CN | 202118620 U | 1/2012 |
| CN | 202144957 U | 2/2012 |
| JP | 2011216437 A | 10/2011 |
| KR | 1020080079745 A | 9/2008 |
| TW | 200940885 A | 10/2009 |
| WO | 2008043540 A1 | 4/2008 |
| WO | 2011085529 A1 | 7/2011 |
| WO | 2011098463 A1 | 8/2011 |

OTHER PUBLICATIONS

Taiwan Patent No. 200940885 (A); Publication Date: Oct. 1, 2009; Abstract Only, 1 Page.
International Publication No. 2011085529 (A1); Publication Date: Jul. 21, 2011; Abstract Only; 2 Pages.
Japanese Patent No. 2011216437 (A); Publication Date: Oct. 27, 2011; Machine Translation; 15 Pages.
Chinese Patent No. 201787401 (U); Publication Date: Apr. 6, 2011; Abstract Only; 1 Page.
Chinese Patent No. 201795452 (U); Publication Date: Apr. 13, 2011; Abstract Only; 1 Page.
Chinese Patent No. 202118620 (U); Publication Date: Jan. 18, 2012; Abstract Only; 1 Page.
Chinese Patent No. 202144957 (U); Publication Date: Feb. 15, 2012; Abstract Only; 1 Page.
Roy L'Abee et al.; "Thermally Conductive and Electrically Insulative Polymer Compositions Containing a Low Thermally Insulative Filler and Used Thereof"; U.S. Appl. No. 61/446,665, filed Feb. 25, 2011.
Roy L'Abee et al.; "Thermally Conductive and Electrically Insulative Polymer Compositions Containing a Low Thermally Conductive Filler and Used Thereof"; U.S. Appl. No. 61/446,666, filed Feb. 25, 2011.
International Search Report; International Application No. PCT/IB2012/052720; International Filing Date: May 30, 2012; Date of Mailing: Nov. 7, 2012; 6 Pages.
Written Opinion of the International Searching Authority; International Application No. PCT/IB2012/052720; International Filing Date: May 30, 2012; Date of Mailing: Nov. 7, 2012; 7 Pages.

* cited by examiner

LED PLASTIC HEAT SINK AND METHOD FOR MAKING AND USING THE SAME

CROSS REFERENCE TO RELATED APPLICATIONS

This application claims priority to U.S. Provisional Application No. 61/491,546, filed May 31, 2011, the contents of which are hereby incorporated by reference.

BACKGROUND

Disclosed herein are heat sinks, and especially light emitting diode (LED) heat sinks and methods of making and using the same.

Light emitting diodes (LEDs) are currently used as replacements for incandescent light bulbs and fluorescent lamps. LEDs are semiconductor devices that emit incoherent narrow-spectrum light when electrically biased in the forward direction of their PN junctions, and are thus referred to as solid-state lighting devices. The high power LED light devices produce considerable amount of heat, which may cause performance degradation or even damage if the heat is not removed from the LED chips efficiently. In an LED light device, the core is a LED chip mounted on a substrate. A transparent top covering the LED chip serves as a lens for modifying the direction of the emitted light. Although there are many different designs, the major heat dissipation route for the heat produced by the LED chip usually is managed through the base to which the LED chip is mounted or through an additional metal heat sink below the base and then to an outer heat sink.

One approach for dissipating heat for LEDs mounted on a printed circuit board is to use a printed circuit board comprising a metal core as compared to traditional printed circuit boards comprising a dielectric core. While metal core printed circuit boards are effective for dissipating heat, disadvantages are increased costs and processing difficulties. In addition, since there are limitations to the size of metal core printed circuit boards, they are more difficult to incorporate into larger size devices.

Another approach for dissipating heat from LEDs is to attach the LEDs directly to a heat sink using a thermally conductive adhesive or tape. A disadvantage of this approach is that it is a labor-intensive process, resulting in increased costs. In addition, the resulting configuration is subject to high failure rates.

Yet another approach to dissipating heat has LEDs on a front side of the printed circuit board, and a heat sink on the back side of the board. To increase the transfer of heat from the circuit board to the heat sink, the printed circuit board has a plurality of holes extending there through, and a plurality of thermally conductive pads is within the printed circuit board. The pads are of a thermally conductive plating, and each pad is associated with at least one of the holes for conducting heat from each of the leads of the LEDs to one of the pads.

It is further noted that die cast aluminum could be used as a heat sink material for LED applications. However, due to productivity issues and secondary operations such as painting of the die cast material, alternative designs to heat sink systems employing aluminum heat sinks also are being sought.

There is a continual need for simplified LED packages having reduced weight, greater design freedom than the designs discussed above, and/or that enhance productivity.

BRIEF DESCRIPTION

Disclosed herein are heat sink systems, articles including the heat sink systems, and methods of making and using the same.

In an embodiment, a heat sink system can comprise: an integrally formed plastic heat sink with printed circuit board package, wherein the printed circuit board package comprises a light emitting diode attached to a surface of substrate, wherein the substrate has a periphery and wherein the heat sink contacts the substrate about its periphery.

In another embodiment, a method of making a heat sink system can comprise, placing a printed circuit board package into a mold, wherein the printed circuit board package comprises a light emitting diode attached to a surface of substrate, melting a thermal conductive plastic, and introducing the thermal insulative plastic to the mold and cooling the thermal insulative plastic to form an integral heat sink system.

In another embodiment, a method of making an integral hybrid heat sink system can comprise: inserting an insert into a mold; melting a thermally conductive plastic; introducing the melted thermally conductive plastic into the mold and into contact with the insert to form a plastic heat sink around the insert upon cooling; and cooling the thermally conductive plastic to form the integral hybrid heat sink system, wherein the plastic heat sink and the insert each have a cylindrical shape, and wherein the insert comprises a feature of lancing provisions, corrugations, embossing, holes, or a combination comprising at least one of the foregoing features.

Also included herein are articles comprising the integral heat sink system.

The above described and other features are exemplified by the following figures and detailed description.

BRIEF DESCRIPTION OF THE DRAWINGS

Refer now to the figures, which are exemplary embodiments, and wherein the like elements are numbered alike

DETAILED DESCRIPTION

Currently LED lighting original equipment manufacturers use TIM (thermal interface material) between the printed circuit board (PCB) and a heat sink to fill the air gap for better heat conduction. However, thermal conductivity (watts per meter Kelvin (W/m-K)) of the TIM is around 1 to 2 W/m-K, so it plays as a bottle neck in heat conduction from the PCB to the heat sink. In addition, the application of the TIM (e.g., TIM pasting process) adds cycle time which results in a cost increase. Additionally, assembly of the PCB and heat sink is by screws, so additional assembly time is needed per article, and potentially induces a crack issue when using thermal conductive plastic as a heat sink due to its brittle nature.

Figure 1:
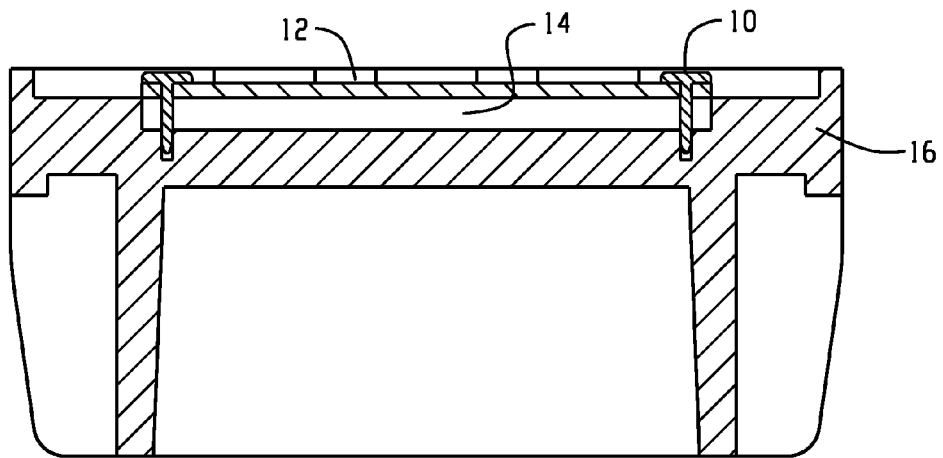
FIG. 1 is a cross-sectional view of an exemplary heat sink assembly comprising thermal interface material between a printed circuit board with a LED package and an aluminum heat sink.

FIG. 1 is a cross-sectional view of an exemplary heat sink assembly comprising thermal interface material 14 (e.g., thermal grease) between an aluminum printed circuit board with an LED (forming a printed circuit board package 12) and an aluminum heat sink 16, with screws 10 enabling the tight assembly between the printed circuit board package 12 and the aluminum heat sink 16. The aluminum PCB is attached to the cast aluminum heat sink 16 using screws 10.

Figure 2:
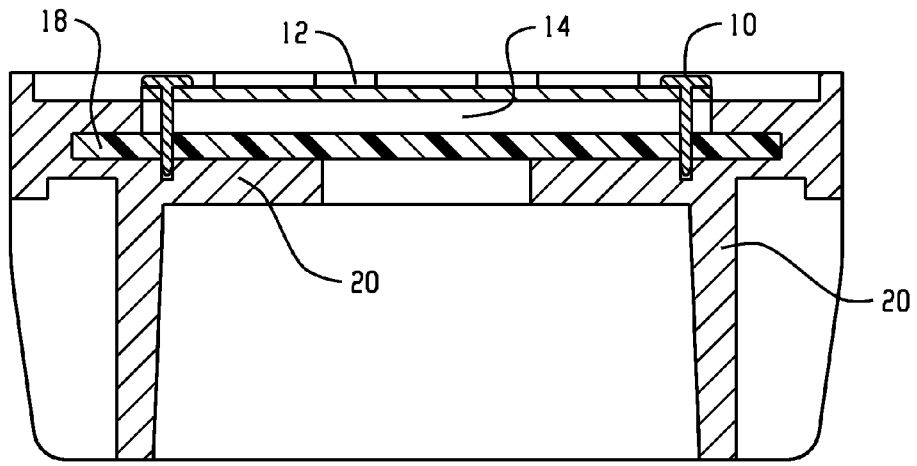
FIG. 2 is a cross-sectional view of an exemplary embodiment of a hybrid heat sink assembly comprising a plastic heat sink with thermal interface material between a printed circuit board with a LED package and the plastic heat sink.

FIG. 2 a cross-sectional view of an embodiment of a hybrid heat sink assembly comprising a thermal interface material 14 between a printed circuit board package 12 (e.g., aluminum) and a hybrid heat sink. Again, attachment elements (e.g., screws) enable the tight assembly between the printed circuit board package 12 and the hybrid heat sink. The hybrid heat sink consists of an aluminum insert (metal portion) 20 and a plastic portion 18, due to heat transfer limitations with plastic itself.

Figure 3:
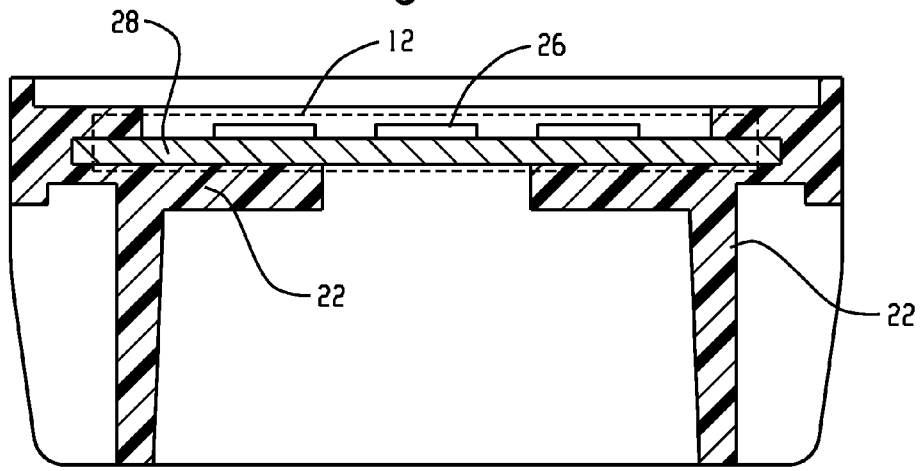
FIG. 3 is a cross-sectional view of another embodiment of a simplified heat sink assembly with a plastic heat sink
Figure 4:
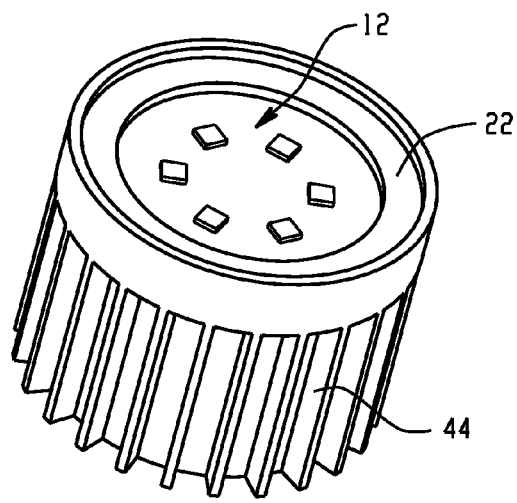
FIG. 4 is a top perspective view of the embodiment of FIG. 3.
Figure 5:
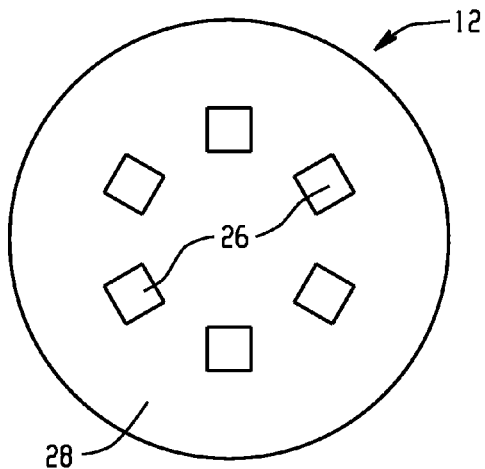
FIG. 5 illustrates the process of the innovative architecture.

An embodiment of the present design can reduce the number of components and/or number of processes. FIGS. 3-5 illustrate a simplified architecture of a LED heat sink with metal PCB. As can be seen, this design eliminates the need for the TIM and the attachment elements. This design has a non-plastic material, such as carbon, graphite, and/or metal (e.g., aluminum, copper, or other metal) PCB 12 molded into a plastic heat sink 22, forming the desired architecture. In other words, the heat sink does not comprise metal attachment elements (e.g., such as elements for engaging a screw, bolt, rivet, or the like, to enhance thermal transfer). Here, the metal PCB can be over-molded with the thermal conductive plastics.

The thermally conductive plastics can also be electrically insulating, e.g., having an electrical resistivity greater than or equal to $10^{13}$ Ohms per square (Ohm/sq). The thermally conductive plastic can comprise an organic polymer and a filler composition comprising graphite and boron nitride. For example, the thermally conductive plastic can have a bulk surface resistivity greater than or equal to $10^{13}$ Ohm/sq, while displaying a thermal conductivity greater than or equal to 2 W/m-K. The melt flow index can be 1 to 30 grams per 10 minutes at a temperature of 280° C. and a load of 16 kilograms force per square centimeter (kg-f/cm$^2$). Exemplary thermally conductive plastics are disclosed in commonly assigned U.S. Patent Ser. Nos. 61/446,665, 61/446,666, and Ser. No. 11/689,228.

The organic polymer used in the thermally conductive plastic can be selected from a wide variety of thermoplastic resins, blend of thermoplastic resins, thermosetting resins, or blends of thermoplastic resins with thermosetting resins, as well as combinations comprising at least one of the foregoing. The organic polymer may also be a blend of polymers, copolymers, terpolymers, or combinations comprising at least one of the foregoing. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at least one of the foregoing. Examples of the organic polymer include polyacetals, polyolefins, polyacrylics, poly(arylene ether) polycarbonates, polystyrenes, polyesters (e.g., cycloaliphatic polyester, high molecular weight polymeric glycol terephthalates or isophthalates, and so forth), polyamides (e.g., semi-aromatic polyamid such as PA4.T, PA6.T, PA9.T, and so forth), polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, or the like, or a combination comprising at least one of the foregoing organic polymers. Examples of polyolefins include polyethylene (PE), including high-density polyethylene (HDPE), linear low-density polyethylene (LLDPE), low-density polyethylene (LDPE), mid-density polyethylene (MDPE), glycidyl methacrylate modified polyethylene, maleic anhydride functionalized polyethylene, maleic anhydride functionalized elastomeric ethylene copolymers (like EXXELOR VA1801 and VA1803 from ExxonMobil), ethylene-butene copolymers, ethylene-octene copolymers, ethylene-acrylate copolymers, such as ethylene-methyl acrylate, ethylene-ethyl acrylate, and ethylene butyl acrylate copolymers, glycidyl methacrylate functionalized ethylene-acrylate terpolymers, anhydride functionalized ethylene-acrylate polymers, anhydride functionalized ethylene-octene and anhydride functionalized ethylene-butene copolymers, polypropylene (PP), maleic anhydride functionalized polypropylene, glycidyl methacrylate modified polypropylene, and a combination comprising at least one of the foregoing organic polymers.

In the context of this application a 'semi-aromatic polyamide' is understood to be a polyamide homo- or copolymer that contains aromatic or semi-aromatic units derived from an aromatic dicarboxylic acid, an aromatic diamine or an aromatic aminocarboxylic acid, the content of said units being at least 50 mol %. In some cases these semi-aromatic polyamides are blended with small amounts of aliphatic polyamides for better processability. They are available commercially e.g. DuPont, Wilmington, Del., USA under the Tradename Zytel HTN, Solvay Advanced Polymers under the Tradename Amodel or from DSM, Sittard, The Netherlands under the Tradename Stanyl For Tii.

Examples of blends of thermoplastic resins include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like.

Examples of thermosetting resins include polyurethane, natural rubber, synthetic rubber, epoxy, phenolic, polyesters, polyamides, silicones, or the like, or a combination comprising at least one of the foregoing thermosetting resins. Blends of thermoset resins as well as blends of thermoplastic resins with thermosets can be utilized.

In one embodiment, an organic polymer that can be used in the conductive composition is a polyarylene ether. The term poly(arylene ether) polymer includes polyphenylene ether (PPE) and poly(arylene ether) copolymers; graft copolymers; poly(arylene ether) ionomers; and block copolymers of alkenyl aromatic compounds with poly(arylene ether)s, vinyl aromatic compounds, and poly(arylene ether), and the like; and combinations including at least one of the foregoing.

The organic polymer can be used in amounts of 10 to 85 weight percent (wt %), specifically, 33 to 80 wt %, more specifically 35 wt % to 75 wt %, and yet more specifically 40 wt % to 70 wt %, of the total weight of the moldable composition.

The filler composition used in the moldable composition comprises graphite and boron nitride. It is desirable to use graphite having average particle sizes of 1 to 5,000 micrometers. Within this range graphite particles having sizes of greater than or equal to 3, specifically greater than or equal to 5 micrometers may be advantageously used. Also desirable are graphite particles having sizes of less than or equal to 4,000, specifically less than or equal to 3,000, and more specifically less than or equal to 2,000 micrometers. Graphite is generally flake like with an aspect ratio greater than or equal to 2, specifically greater than or equal to 5, more specifically greater than or equal to 10, and even more specifically greater than or equal to 50. In one aspect, the graphite is flake graphite, wherein the flake graphite is typically found as discrete flakes having a size of 10 micrometers to 800 micrometers in diameter (as measured along a major axis) and 1 micrometers to 150 micrometers thick, e.g., with purities ranging from 80-99.9% carbon. In another aspect the graphite is spherical.

Graphite is generally used in amounts of greater than or equal to 10 wt % to 30 wt %, specifically, 13 wt % to 28 wt %, more specifically 14 wt % to 26 wt %, and yet more specifically 15 wt % to 25 wt %, of the total weight of the moldable composition.

Boron nitride may be cubic boron nitride, hexagonal boron nitride, amorphous boron nitride, rhombohedral boron nitride, or another allotrope. It may be used as powder, agglomerates, fibers, or the like, or a combination comprising at least one of the foregoing.

Boron nitride has an average particle size of 1 to 5,000 micrometers. Within this range boron nitride particles having sizes of greater than or equal to 3, specifically greater than or equal to 5 micrometers may be advantageously used. Also desirable are boron nitride particles having sizes of less than or equal to 4,000, specifically less than or equal to 3,000, and more specifically less than or equal to 2,000 micrometers. Boron nitride is generally flake like with an aspect ratio greater than or equal to 2, specifically greater than or equal to 5, more specifically greater than or equal to 10, and even more specifically greater than or equal to 50. An exemplary particle size is 125 to 300 micrometers with a crystal size of 10 to 15 micrometers. The boron nitride particles can exist in the form of agglomerates or as individual particles or as combinations of individual particles and agglomerates. Exemplary boron nitrides are PT350, PT360 or PT 370, commercially available from General Electric Advanced Materials.

Boron nitride (BN) is generally used in amounts of 5 wt % to 60 wt %, specifically, 8 wt % to 55 wt %, more specifically 10 wt % to 50 wt %, and yet more specifically 12 wt % to 45 wt %, of the total weight of the moldable composition. An exemplary amount of boron nitride is 15 to 40 wt % of the total weight of the thermally conductive plastic. In one aspect, the BN has a BN purity of 95% to 99.8%. In one aspect, a large single crystal sized flake BN with an average size of 3 to 50 micrometer and a BN purity of over 98% is used. The particle size indicated here means the single BN particle or its agglomerate at any of their dimensions.

One or more low thermal conductivity fillers can be used. The low thermal conductivity, electrically insulative filler has an intrinsic thermal conductivity of from 10 to 30 W/mK, specifically, 15 to 30 W/mK, and more specifically, 15 to 20 W/mK. The resistivity can be greater than or equal to $10^5$ Ohm·cm. Examples of the low thermal conductivity filler include, but are not limited to, ZnS (zinc sulfide), CaO (calcium oxide), MgO (magnesium oxide), ZnO (zinc oxide), $TiO_2$ (titanium dioxide), or a combination comprising at least one of the foregoing.

One or more high thermal conductivity, electrically insulative fillers can be used. The high thermal conductivity filler has an intrinsic thermal conductivity greater than or equal to 50 W/mK, specifically, greater than or equal to 100 W/mK, more specifically, greater than or equal to 150 W/mK. The resistivity can be greater than or equal to $10^5$ Ohm·cm. Examples of the high thermal conductivity, electrically insulative filler include, but are not limited to, AlN (aluminum nitride), BN (boron nitride), $MgSiN_2$ (magnesium silicon nitride), SiC (silicon carbide), ceramic-coated graphite, or a combination comprising at least one of the foregoing.

One or more high thermal conductivity, electrically conductive fillers can be used. The high thermal conductivity, electrically conductive filler has an intrinsic thermal conductivity greater than or equal to 50 W/mK, specifically, greater than or equal to 100 W/mK, more specifically, greater than or equal to 150 W/mK. The resistivity can be less than or equal to 1 Ohm·cm. Examples of the high thermal conductivity, electrically conductive filler include, but are not limited to, graphite, expanded graphite, graphene, carbon fiber, carbon nanotubes (CNT), graphitized carbon black, or a combination comprising at least one of the foregoing.

Additionally, the thermally conductive plastic can optionally also contain additives such as antioxidants, such as, for example, organophosphites, for example, tris(nonyl-phenyl) phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate, octadecyl 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, titanium dioxide ($TiO_2$), calcium carbonate, talc, mica and other additives such as, for example, mold release agents, ultraviolet absorbers, stabilizers such as light stabilizers and others, lubricants, plasticizers, pigments, dyes, colorants, anti-static agents, blowing agents, flame retardants, impact modifiers, among others, as well as combinations comprising at least one of the foregoing additives.

The thermally conductive plastic can comprise a random distribution of graphite and boron nitride and can have a thermal conductivity of greater than 2 Watts per meter-Kelvin (W/mK). The thermally conductive plastic can have a thermal conductivity of 2 to 6 W/mK, specifically, 2.2 W/mK to 4.0 W/mK, more specifically 2.3 W/mK to 3.9 W/mK, and yet more specifically 2.4 W/mK to 3.8 W/mK.

The thermally conductive plastic can comprise: 35 volume percent (vol %) to 80 vol % of a thermoplastic polymer; 5 vol % to 45 vol % of a thermally insulative filler with an intrinsic thermal conductivity less than or equal to 10 W/mK; and 5 vol % to 15 vol % of a thermally conductive filler with an intrinsic thermal conductivity greater than or equal to 50 W/mK. The thermally conductive plastic can have a thermal conductivity of at least 1.0 W/mK, a thermal conductivity of at least 7 times the total filler volume fraction times the thermal conductivity of the pure thermoplastic polymer; and/or a volume resistivity of at least $10^7$ Ohm-centimeter (Ohm·cm). Optionally, the thermally conductive filler can comprise AlN, BN, $MgSiN_2$, SiC, graphite, ceramic-coated graphite, expanded graphite, graphene, a carbon fiber, a carbon nanotube, graphitized carbon black, or a combination comprising at least one of the foregoing thermally conductive fillers. In one embodiment, the thermoplastic polymer comprises a polyamide, polyester, polyethylene and ethylene based copolymer, polypropylene, polyphenylene sulfide, or a combination comprising at least one of the foregoing; the thermally insulative filler comprises talc, $CaCO_3$, $Mg(OH)_2$, or a combination comprising at least one of the foregoing; and the thermally conductive filler comprises graphite.

Optionally, the thermally conductive plastic (e.g., the composition) can comprise: 35 vol % to 80 vol % of a thermoplastic polymer; 5 vol % to 45 vol % of a low thermal conductivity, electrically insulative filler with an intrinsic thermal conductivity of 10 W/mK to 30 W/mK; 2 vol % to 15 vol % of a high thermal conductivity, electrically insulative filler with an intrinsic thermal conductivity greater than or equal to 50 W/mK; and 2 vol % to 15 vol % of a high thermal conductivity, electrically conductive filler with an intrinsic thermal conductivity greater than or equal to 50 W/mK. The composition can have a thermal conductivity of at least 1.0 W/mK and/or a volume resistivity of at least $10^7$ Ohm·cm.

An example of a thermally conductive plastic is Konduit* thermally conductive plastic commercially available from SABIC Innovative Plastics, Pittsfield, Mass., including, but not limited to, grades PX08321, PX08322, PX09322, PX10321, PX10322, PX10323, and PX10324.

The PCB package 12 can comprise a substrate 28 with light emitting diode(s) (LEDs) 26 mounted thereon to form the package. The LEDs 26 can be mounted on the substrate using various techniques, such as soldering. The substrate 28 has a wiring for supplying a drive current to the LEDs 26. Further, the LED substrate 28 can include a terminal for supplying the drive current to the light-emitting diodes (LEDs) 26. The wiring 30 can be made of, for example, copper or a copper-base metal material, and the light-emitting diodes (LEDs) 26 mounted on the substrate 28 are electrically connected to the wiring 30.

Figure 6:
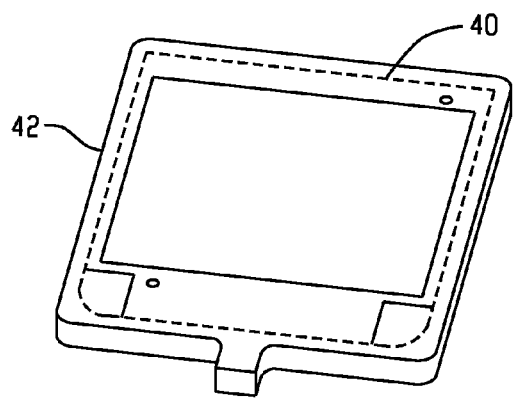
FIGS. 6-7 are perspective views of exemplary embodiments of PCB packages with a chip on board (COB).
Figure 7:
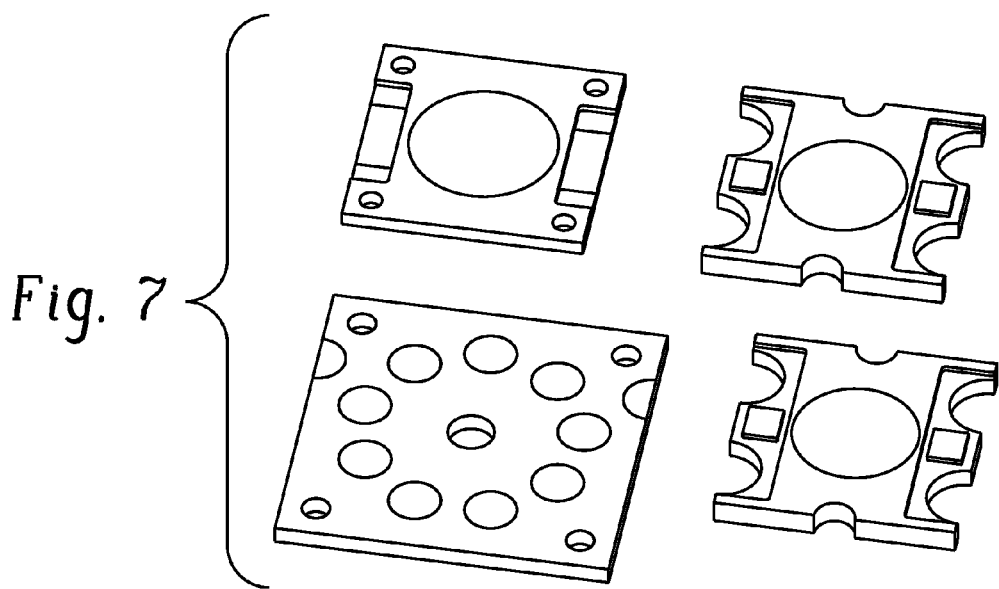

Optionally, the PCB package (which includes an LED) 12 can comprise a substrate (without a circuit) 42 supporting a LED and printed circuit 40 as shown, for example, in FIG. 6. The PCB package 12 can comprise a COB (chip on board) and/or COHC (chip on heat sink). Hence, in the various embodiments disclosed herein, COBs and/or COHCs can be used in addition or alternative to the LED.

Figure 8:
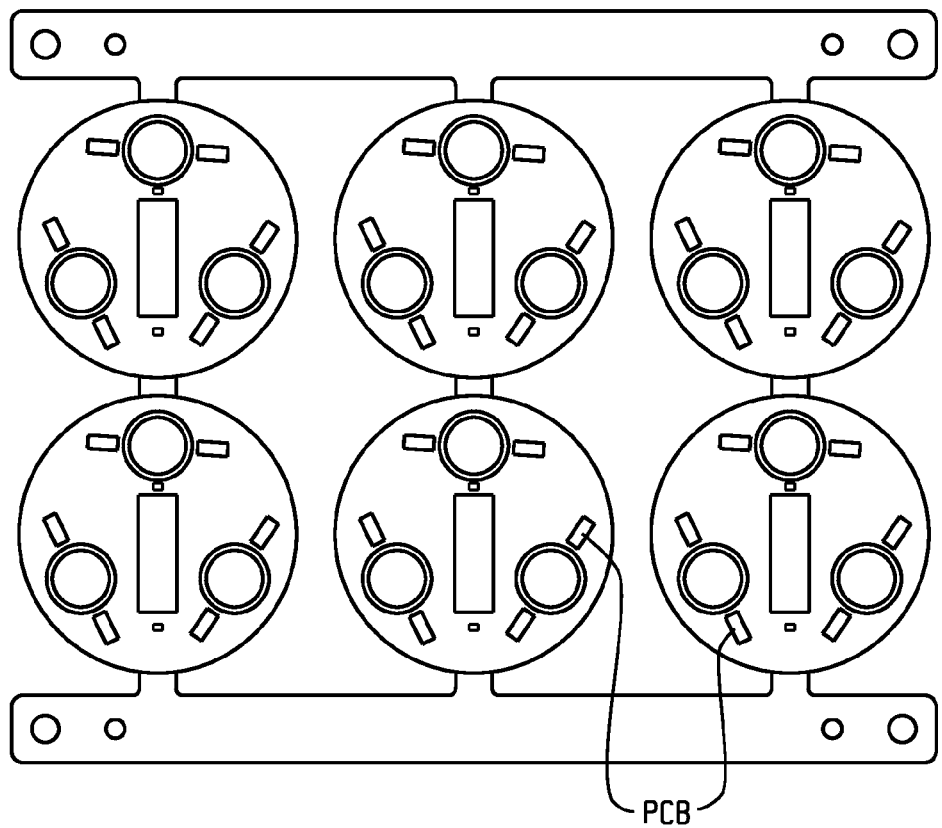
FIG. 8 is a top view of a printed circuit board (PCB) package (including the LED package).
Figure 9:
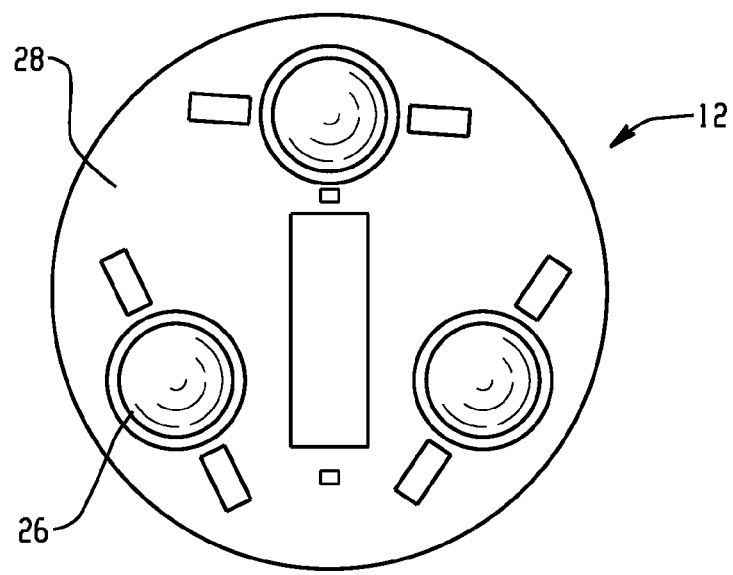
FIG. 9 is a top view of one of the PCB packages of FIG. 8.

FIG. 8 is an illustration of a PCB, while FIG. 9 is an illustration of a PCB with a LED package mounted thereon via a surface mounting process.

Figure 10:
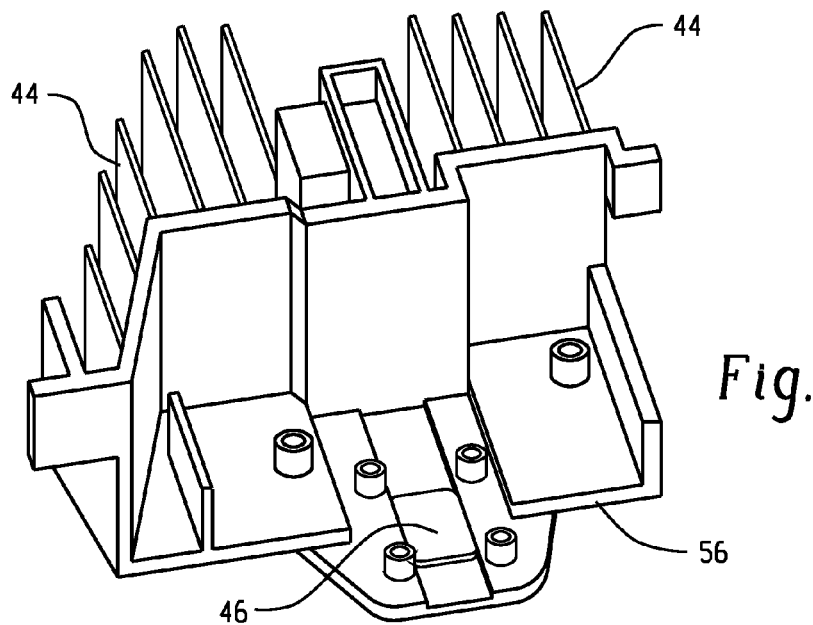
FIG. 10 is a perspective view of an embodiment of a heat sink.
Figure 11:
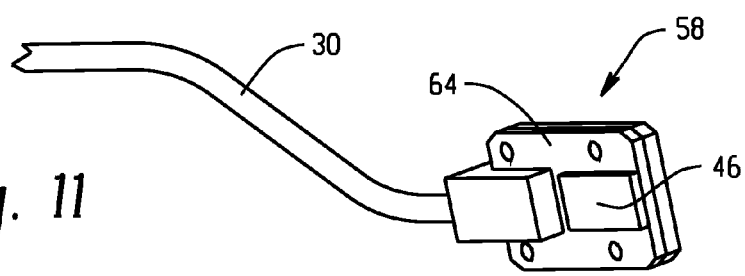
FIG. 11 is a perspective view of an embodiment of a LED assembly.
Figure 12:
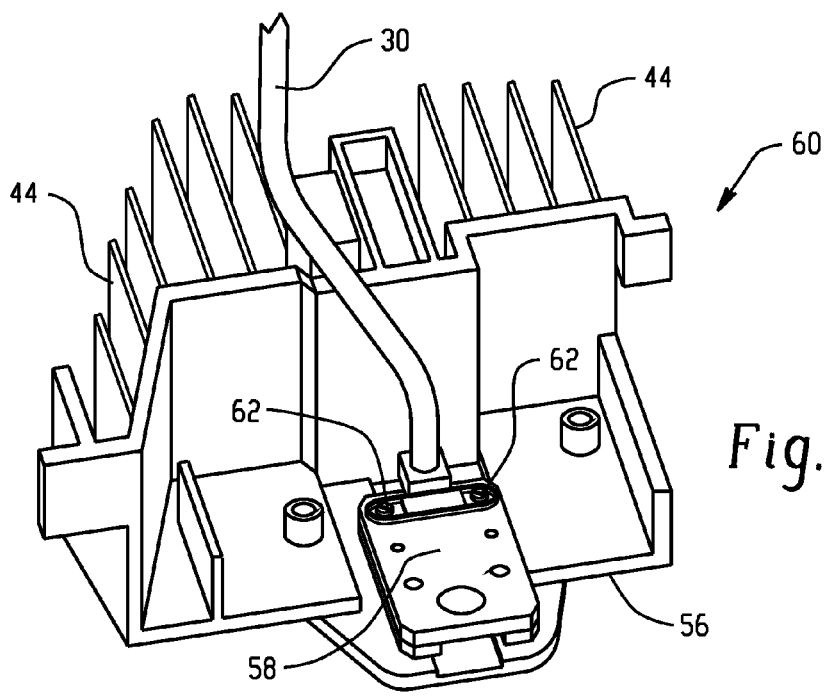
FIG. 12 is a perspective view of an embodiment of heat sink assembly comprising the LED assembly of FIG. 11 and the heat sink of FIG. 10.

FIG. 10 illustrates a heat sink, FIG. 11 illustrates a LED assembly 58, and FIG. 12 illustrates a heat sink assembly comprising the heat sink 56 and LED assembly 58. The present process and assembly can eliminate the thermal interface material 46 disposed in the interface between the LED assembly 58 and the heat sink 56, and eliminate the attachment elements 62 (e.g., separate (i.e., independent) elements such as screws, bolts, rivets, etc.). The process for forming a heat sink assembly absent the TIM 46 and attachment elements 62 can comprise disposing the LED assembly (without TIM applied to the assembly), into a mold tool. Thermal conductive plastic is then injected into the mold to form the integral heat sink assembly. In this way, the LED assembly and heat sink are a single molded assembly (e.g., they cannot be separated; i.e., without damage to the heat sink and/or LED assembly). Optionally, the size of the substrate 64 of the LED assembly 58 (e.g., the brass plate) can be adjusted to manage heat dissipation. For example, the substrate 64 of FIG. 11 can be enlarged (compared to a LED assembly comprising TIM and that uses attachment elements) to enhance the heat dissipation from the LEDs into the heat sink, and/or some or all of the attachment openings can be eliminated. Some openings in the substrate can be retained such that the thermally conductive material can pass through the holes, further securing the elements together.

The design of the heat sink is dependent upon the particular application and heat transfer needed. The shape of the heat sink is complementary to the PCB/COB/COHS package that will be integrally formed with the heat sink. Hence, the heat sink can have a round or polygonal cross-sectional geometry. The heat sink can also comprise heat dissipation elements. These elements can be located on the wall(s) and/or the side of the heat sink opposite the LEDs. Referring to FIG. 4, heat dissipation elements (e.g., fins) 44 are illustrated. The fins 44 are disposed radially around the heat sink, extending outward from the body and increasing the surface area of the plastic heat sink. FIGS. 10 and 12 illustrate other heat dissipation element designs wherein fins extend outward, e.g., laterally. Any design and suitable spacing of the heat dissipation elements 44 are possible. The heat dissipation elements 44 increase the surface area of the heat sink to enhance heat dissipation away from the LED assembly.

FIG. 15A through FIG. 18 illustrate further architecture for hybrid heat sink systems. Illustrated in these figures are hybrid heat sink systems 80, also including heat dissipating elements (e.g., fins) 44. Specifically, the hybrid heat sink system 80 can comprise an integrally formed plastic heat sink 82 and an insert (e.g., metal insert) 84, wherein the plastic heat sink 82 can comprise the afore-described thermally conductive material. It has herein been further determined that the heat dissipation performance can be enhanced by increasing the surface area of the plastic heat sink 82 and/or increasing the surface area of the contact between the insert 84 and the plastic heat sink 82. These designs utilize such principles in improving the overall thermal performance of the resultant over-molded part.

Thus, a hybrid heat sink system 80 can comprise an integrally formed plastic heat sink 82 and an insert 84, wherein the plastic heat sink 82 optionally comprises radially extending fins 44. The plastic heat sink 82 and the insert 84 can have a shape commensurate with the needs of the LED, e.g., a cylindrical shape or a cup shape. The hybrid heat sink system 80 also can comprise at least one of the following, as further described below, i) lancing provisions 86 on the insert 84; ii) the insert 84 being a sheet metal with corrugations 98; iii) embossing 90 on the insert 84; iv) holes 88 (also referred to as "microholes") located in the plastic heat sink 82 and/or insert 84; v) embossing 100 located between the radially extending fins 44; and vi) any combination of features (i)-(v).

Figure 15A:
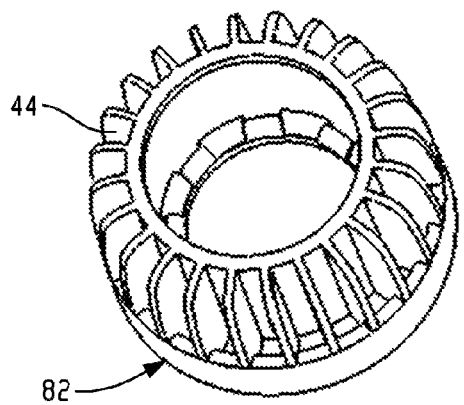
FIG. 15A is a perspective view of an embodiment of a plastic heat sink.
Figure 16A:
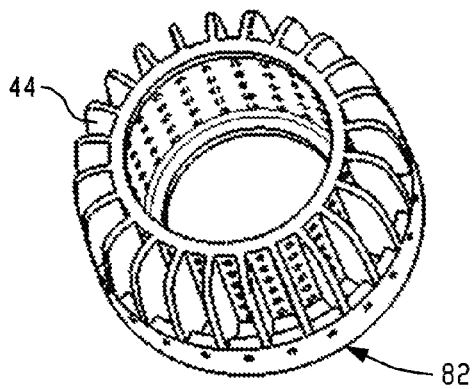
FIG. 16A is a perspective view of an embodiment of a plastic heat sink comprising holes.
Figure 15B:
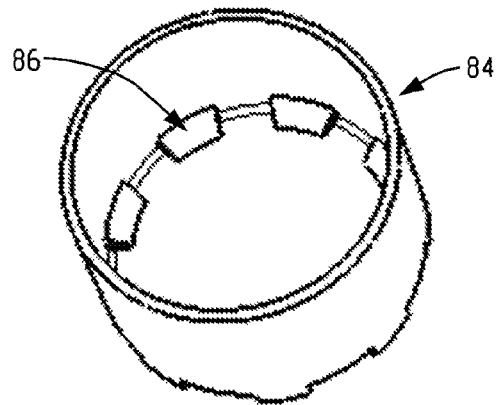
FIG. 15B is a perspective view of an embodiment of an insert comprising lancing provisions.
Figure 16B:
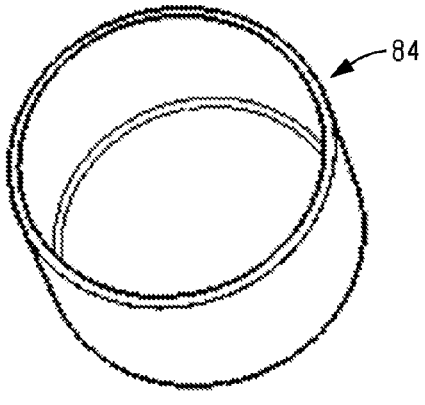
FIG. 16B is a perspective view of an embodiment of a cup shaped insert.
Figure 15C:
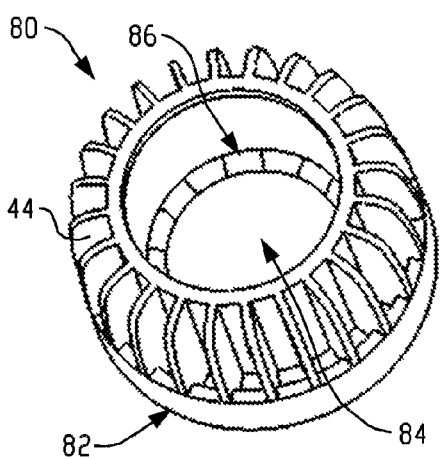
FIG. 15C is a perspective view of the resultant hybrid heat sink system.
Figure 16C:
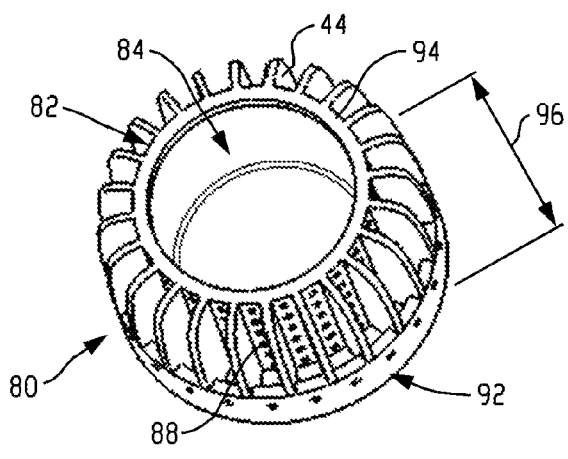
FIG. 16C is a perspective view of the resultant hybrid heat sink system.
Figure 17A:
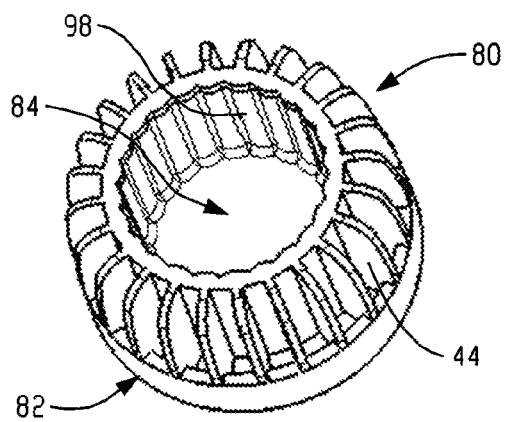
FIG. 17A is a perspective view of an embodiment of a hybrid heat sink system comprising a sheet insert with increased surface area of contact as a result of corrugation on the sheet metal.
Figure 18:
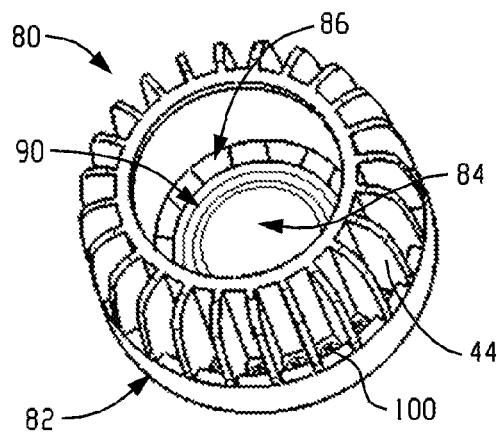
FIG. 18 is a perspective view of an embodiment of a hybrid heat sink system comprising a sheet metal insert with embossing.

In brief and as further described below, FIG. 15A is a perspective view of an embodiment of a plastic heat sink 82, FIG. 15B is a perspective view of an embodiment of insert 84 comprising lancing provisions 86, and FIG. 15C is a perspective view of the resultant metal-plastic (e.g., integrally formed) hybrid heat sink system 80. FIG. 16A is a perspective view of an embodiment of a plastic heat sink 82 comprising holes 88, FIG. 16B is a perspective view of an embodiment of a cup shaped insert 84, and FIG. 16C is a perspective view of the resultant metal-plastic integrally formed hybrid heat sink system 80. FIG. 17A is a perspective view of an embodiment of a metal-plastic integrally formed hybrid heat sink system 80 comprising a sheet metal insert 84 with increased surface area of contact between the insert 84 and the plastic heat sink 82. FIG. 18 is a perspective view of an embodiment of a metal-plastic integrally formed hybrid heat sink system 80 comprising a sheet metal insert 84 with embossing 90.

The design and shape of the hybrid heat sink system 80 of FIGS. 15C, 16C, 17A and 18, and particularly the design and shape of the plastic heat sink 82 are dependent upon the specific application and heat transfer needed. The shape of the plastic heat sink 82 is complementary to, e.g., an LED package comprising an LED chip that can be formed with the plastic heat sink 82. For example, the plastic heat sink 82 can have a round, cylindrical, or polygonal cross-sectional geometry. FIGS. 15A, 15C, 16A, 16C, 17A, and 18 illustrate various cylindrical shaped plastic heat sinks 82. For example if the application is LED light bulb, the shape of the heat sink will likely be circular.

The nominal wall thickness for the part can vary from 0.8 mm to 3.5 mm. The rib thickness can be from 0.8 mm to 3.5 mm depending upon the structural and thermal requirements.

Similarly, insert 84 can be made of complementary shape and size, and can be made of a material having a desired thermal conductivity, e.g., a thermal conductivity greater than or equal to 100 W/m-K, specifically, greater than or equal to 150 W/m-K, and more specifically, greater than or equal to 175 W/m-K. Examples of materials for the insert include aluminum, copper, steel, carbon, graphite, brass, silver, and combinations comprising at least one of the foregoing. The specific dimensions of the insert are dependent on its thermal conductivity and the desired heat transfer thereby. For example, the thickness of the insert can be up to several mm thick or thicker, specifically, up to 10 mm, more specifically, 0.05 mm to 5 mm, and more specifically 0.1 mm to 3 mm.

Figure 20:
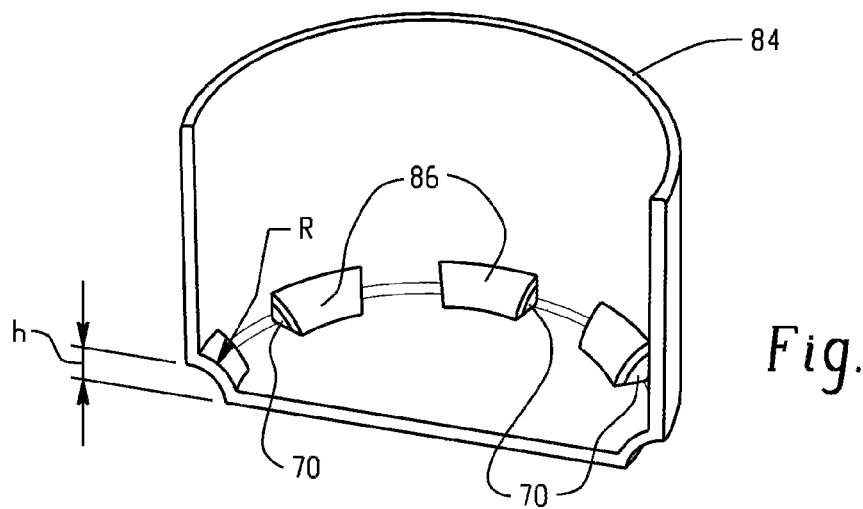
FIG. 20 is a partial perspective view of the insert of FIG. 19D illustrating the lancing provisions (height and radius).

The hybrid heat sink system 80 shown in the embodiment of FIG. 15C includes metal insert 84 comprising lancing provisions 86. The lancing provisions 86 (e.g., which comprise openings 70 formed by portion(s) of the insert wall that are bent inward or outward, which are also shown in FIGS. 15B and 20, receive the flow of thermally conductive plastic material during molding. As shown in FIGS. 15B and 15C, the lancing provisions are openings (e.g., slots) that can be located around the periphery of the insert 84 (e.g., metal insert), such as about the periphery near an end of the insert. Although the lancing provisions are illustrated as located along the corner between the sidewall and the bottom, they can alternatively or also be located along the sidewall. The lancing provisions' shape can be rounded and/or polygonal, such as partial circles (e.g., half circles and/or quarter circles). The spacing between the lancing depends upon the thickness of the insert (e.g., sheet metal) and also the desired bonding strength. For example, the spacing of the spacing between the lancing can be equal to 1 to 10 times the thickness of the wall comprising the lancing provision, specifically, 2 to 8 times the thickness, and more specifically, 3 to 5 times the thickness.

The hybrid heat sink system 80 shown in the embodiment of FIG. 16C includes the insert 84 having a cup shape and integrally formed with plastic heat sink 82, wherein plastic heat sink 82 comprises holes 88 located between radially extending fins 44. As shown in FIGS. 16A and 16C, the holes can extend from a base portion 92 of plastic heat sink 82 to an opposite portion (e.g., top portion) 94 of the plastic heat sink 82. Alternatively, the holes 88 need not extend the entire length 96 of plastic heat sink 82. As a result of holes 88, the surface area of the plastic heat sink 82 is increased thereby increasing the convective heat transfer. The holes can have any geometry, with a round geometry generally employed due to ease of manufacture. The size of the holes is based upon the size of the heat sink. Generally, the holes have a size of less than or equal to a few millimeters (e.g., less than or equal to 3 mm), specifically, 0.025 mm to 3 mm, more specifically, 0.05 mm to 2 mm, and more specifically, 0.5 mm to 1.5 mm. The spacing between the holes (e.g., the edge of one hole to the edge of the next, adjacent hole) can be up to 5t or more, specifically, 0.5t to 3t, and more specifically, 1t to 1.5 t, wherein "t" is the thickness of the wall comprising the hole.

The hybrid heat sink system 80 shown in the embodiment of FIG. 17A includes an insert 84, such as sheet metal, having a cup shape and integrally formed with plastic heat sink 82. In this embodiment, the metal insert 84 also comprises corrugations 98. The corrugations 98 increase the surface area of contact between the insert 84 and the plastic heat sink (housing) 82. Thus, the conduction heat transfer is improved thereby enhancing the heat dissipation performance of the hybrid heat sink system 80. The radius ("R", see FIG. 17B) of the corrugations will be governed by the manufacturing process of the insert. In some embodiments the radius of the corrugation is 2.5 t to 10 t (not limiting factor). For example, the radius can be up to 20 mm, specifically, 1 mm to 15 mm, and more specifically, 2.5 mm to 10 mm. For example, with a corrugation radius of 2.5 mm, height 0.7 mm width 2.4 mm, the surface area can increase by greater than or equal to 11 mm² compared to the same size and heat sink with the only difference being the lack of corrugations.

Referring to FIG. 18, the hybrid heat sink system 80 shown therein includes insert 84 (e.g., a sheet metal) having embossing 90 and integrally formed with plastic heat sink 82. Embossing 100 also could be optionally present on the plastic heat sink 82, as also shown in FIG. 18. The embossing 90 is shown on the insert 84 as a plurality of circular groves. However, other shapes and configurations of embossing 90 are contemplated. Similarly, the embossing 100 on the plastic heat sink 82 is shown as a circular protrusion located between each fin 44, but other shapes and configurations of embossing 100 for the plastic heat sink 82 also are contemplated, and the protrusions need not be located between each fin 44. For example, alternating the embossing 100 (protrusions) such that it is located between every other fin 44 could be employed. As a result of the hybrid design including embossing 90 and/or embossing 100 is an increased surface area. This increased surface area enables increased heat dissipation from the plastic heat sink 82 and the insert 84. Again, the size of the embossing is dependent upon the process being used, the size of the insert and plastic heat sink, and the materials. For example, the embossing can have a size, e.g., a diameter, (as measured along a major axis), of greater than or equal to 0.05 mm, specifically, 0.05 to 3 mm, more specifically, 0.1 to 2 mm.

It is noted that any combination of the afore-described features of the above-described embodiment are contemplated herein. For example, FIG. 18 shows the combined use of lancing provisions 86, and embossing 90,100. Any combination of lancing provisions 86, embossing 90, embossing 100, holes 88, and/or corrugations 98 could be employed on the insert 84 and/or plastic heat sink 82. Also, while fins 44 are shown in the afore-referenced designs, such fins 44 are not required and need not be present in each embodiment.

It is further noted that the LEDs used in conjunction with the various designs described herein can be formed, for example, out of red LEDs emitting red (R) light, green (G) LEDs emitting green light, blue (B) LEDs emitting blue light, or a combination comprising at least one of the foregoing. By mixing light beams from the RGB LEDs (or equivalently, color mixing), a light source having a wide range of color reproducibility can be achieved.

Insert molding can be used to form the plastic heat sinks described herein with the PCB without the need for separate attachment mechanism. In other words, insert molding the PCB and heat sink forms a single, integral component. Unlike prior designs wherein the screws could be removed and the components disassembled, the integral design cannot be disassembled without damaging some or all of the components.

During the insert molding, a PCB package is placed in a mold. The thermal conductive plastic is heated to a molten state and introduced to the mold to form the heat sink comprising the PCB package. The temperatures employed are based upon the particular materials and the integrity of the PCB package and the temperature needed to melt the plastic. In some embodiments, the plastic is melted at a temperature of 150 to 200° C. The mold can be held at a lower temperature, e.g., less than or equal to 100° C. (specifically 85° C. to 95° C.). After the thermal conductive material has been introduced to the mold, the mold can be cooled (actively and/or passively). The resultant heat sink system is an integral system that can be employed in numerous applications.

Similarly, such insert molding could be used herein to form the integral hybrid heat sink system 80 shown in FIGS. 15C, 16C, 17, and 18, without the need for any separate attachment mechanisms. Thus, a method of making an integral hybrid heat sink system 80 can comprise placing an insert 84 into a mold, melting a thermally conductive plastic. The molten plastic is introduced into the mold where it contacts the insert 84 to form a plastic heat sink 82 around a portion of the insert 84 upon cooling.

As LED chip and package technology is improved in the future, the heat generated by LED can be reduced. In such a case, use of normal plastic can also be expected. By removing the TIM and screw(s), total cycle time and system cost can be reduced. In addition, by replacing current Al die-casting process to plastic molding, productivity is significantly improved.

Example 1

Thermal CAE (computer aided engineering) analysis (simulation) comparing a baseline design with hybrid design architecture described herein (e.g., FIG. 2 including a plastic heat sink). FIG. 1 illustrates an aluminum baseline design. FIGS. 2 and 3 are the models used for analysis. For all 3 samples, the outer diameter with the fins is 58 mm, the height of the heat sink is 33 mm, the number of fins is 24, the wall thickness is 1.5 mm, and the volume is approximately 20.6 cm³.

As the material changed from aluminum (Al) to plastic in the hybrid design, the degree of design freedom enables designers to achieve comparable heat dissipation performance of an Al heat sink. Accordingly, comparison only between the plastic architecture set forth herein and the hybrid design is reasonable. In this computer simulation, it is assumed that there is no air gap during TIM processing in the hybrid design.

The LED junction temperature of the design for FIG. 1 is 51.09° C. while the hybrid design of FIG. 2 shows a junction temperature of 59.55° C. and FIG. 3 shows a temperature of 57.75° C. These results demonstrate that heat dissipation performance can be improved through the plastic architecture with use of the hybrid designs described herein. It is assumed that the amount of improvement in real samples will be much more than the CAE analysis and also can be varied depending on heat sink model.

Example 2

Figure 19A:
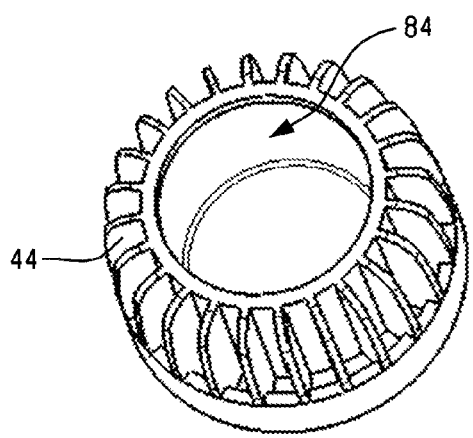
FIGS. 19A, 19B, 19C and 19D are perspective views of various hybrid heat sink systems used for thermal analysis (baseline, lancing concept, embossing concept and lancing with ribs, respectively).
Figure 17B:
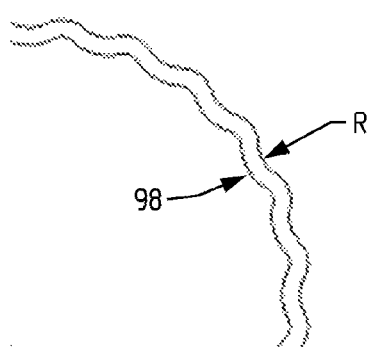
FIG. 17B is a partial end view of the corrugated insert of FIG. 17A.
Figure 19B:
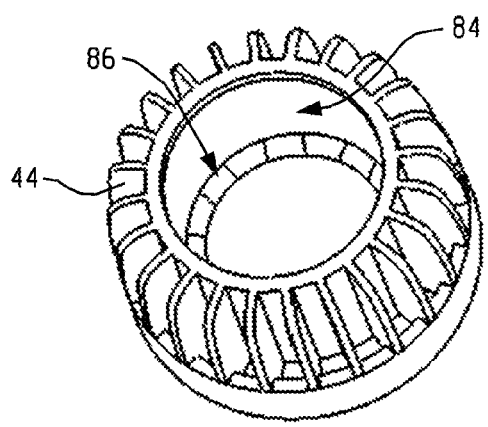
Figure 19C:
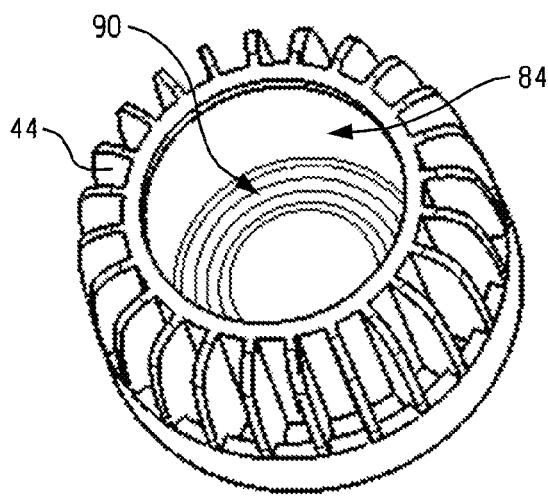
Figure 19D:
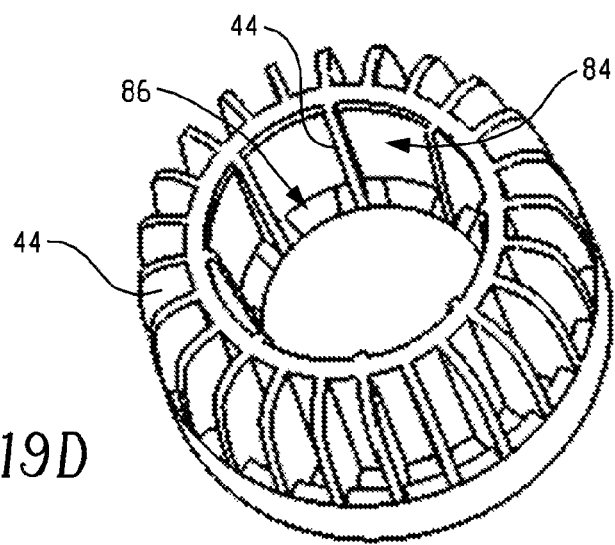

Thermal CAE (computer aided engineering) analysis (simulation) was conducted on various hybrid designs proposed herein. For a three watt heat source on a LED chip, simulations were conducted to determine the effectiveness of these designs. For all of the tested designs, a reduction in temperature of the LED chip was observed. More specifically, Table 1 below sets forth the results of the thermal analysis testing on these hybrid designs. Sample 1, considered as the baseline case, is illustrated in FIG. 19A; Sample 2 including lancing provisions 86 is illustrated in FIG. 19B; Sample 3 including embossing 90 (height of 1.4 mm) is illustrated in FIG. 19C; and Sample 4 including lancing provisions 86 with inside fins 44 is illustrated in FIG. 19D, with a height of 4 mm and radius of 3 mm (see FIG. 20). All of Samples 1-4 had the same outer diameter with the fins of 58 mm, the height of the heat sink of 33 mm, the number of fins of 24, the wall thickness of 1.5 mm, and the volume of approximately 20.6 cm³.

The simulations of these samples were performed at a 3 watt heat source. The heat was applied until steady state was reached. As can be seen from the results set forth below in Table 1, a reduction in temperature of the LED chip can be observed. Furthermore, the greater the increase in surface area, the greater the temperature reduction.

TABLE 1

(For a 3 watt heat source)

| Case no. | Description | Maximum Temperature of LED Chip (° C.) | Temperature reduction (° C.) | Contact Surface area (mm$^2$) |
|---|---|---|---|---|
| 1 | Baseline case | 75.8 | | 3400 |
| 2 | Lancing Concept | 71.2 | 4.6 | 4390 |
| 3 | Embossing Concept | 74 | 1.8 | 3500 |
| 4 | Lancing with Ribs (Fins) | 73.2 | 2.6 | 4630 |

The present plastic heat sink with LED/COB/COHC is a simplified design that can be free of thermal interface material, free of screws and other connectors (bolts, rivots, clamps, snaps, and so forth), and free of a separate metal insert. As a result of these changes, the number of processing steps to form the device is also reduced. For example, the present process eliminates the applying and curing the thermal interface material, eliminates stamping and inserting the metal insert, and eliminates connecting the elements together with attachment elements (e.g., screws).

Furthermore, the present insert molding process and elimination of the attachment elements also removes the issue associated with many thermally conductive materials, e.g., their lack of ductility. The brittle nature of many thermally conductive plastics rendered them unfit for use as a heat sink with a PCB attached thereto with an attachment element. Since no attachment elements are needed, potential cracking problems caused thereby are eliminated.

Many embodiments of the heat sink systems disclosed herein (comprising a LED assembly directly attached to a plastic heat sink (i.e., without TIM between the LED assembly and the heat sink and without separate attachment elements holding the LED assembly to the heat sink)) can be employed in any application using heat dissipation from a LED into a heat sink. Possible applications include lighting (e.g., street light, EPL (explosion proof light) series, CGC series (e.g., commercially available from CGC Industrial Col. Ltd, China) indoor and outdoor lighting, automotive (e.g., headlights), and so forth). For example, MFR LED package and heat sink, LED driver module, LED leveling device, low beam MFR reflector, and others.

In an embodiment, the article can be a light (e.g., a headlight), comprising a housing, a reflector located in the housing in optical communication with a heat sink system, and a lens covering the LED assembly. The heat sink system comprises an integral LED assembly and plastic heat sink. The heat sink system can be free of TIM between the LED assembly and the heat sink, and/or free of separate attachment elements (e.g., screws and the like).

Figure 13:
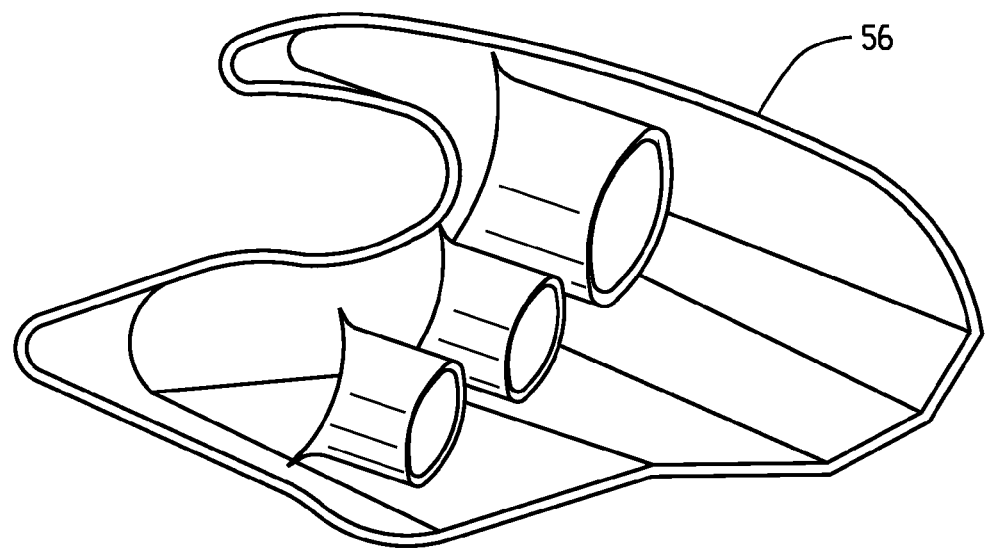
FIG. 13 is a perspective view of an embodiment of a housing for a headlight.
Figure 14:
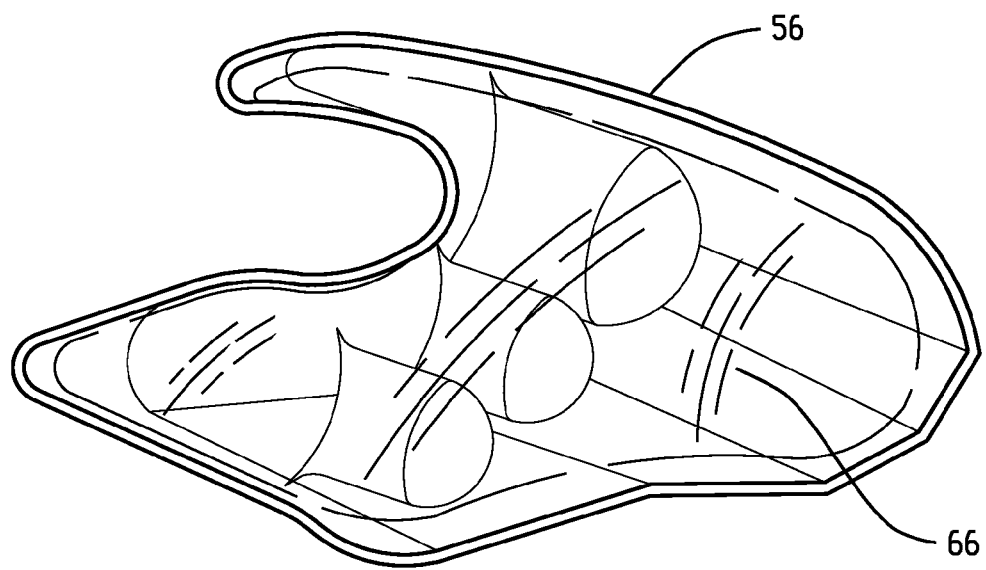
FIG. 14 is a perspective view of an embodiment of a headlight comprising the housing of FIG. 13.

As is illustrated in FIGS. 13 and 14, the heat sink can also function as the housing, e.g., for a light (e.g., automotive headlight). In such an embodiment, the light comprises a heat sink system comprising a plastic heat sink in the shape of a housing, and a LED assembly integral with the heat sink. A lens is disposed across the housing over the LED assembly.

Advantages of the present designs include good electrical isolation, enhanced productivity (e.g., reduced number of parts and simplified assembly), weight reduction (compared to the same style assembly with the metal heat sink, TIM, and attachment elements), greater design freedom, high sealing level.

In general, the plastic architecture process may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

Intrinsic thermal conductivity of a component, as used herein, is based on indicative values described in the literature, such as in "Thermal conductivity of Nonmetallic Solids," Y. S. Touloukian, R. W. Powell, C. Y. Ho, and P. G. Klemans, IFI/Plenum: New York-Washington, 1970 or "Thermal Conductivity—Theory, Properties and Applications," T. M. Tritt, Ed., Kluwer Academic/Plenum Publishers: New York, 2004. Thermal conductivity of a composition, as used herein, is tested according to ASTM E1461 in the through-plane (sample thickness) direction. It is the thermal conductivity of the material independent of how much of the material is present and independent of the form (shape, size, etc.) of the material.

Volume resistivity, as used herein, is measured by notching a sample bar on both ends followed by a cold-fracture at −60° C. The fractured surfaces are treated with silver paint and dried. The resistance through the bar is measured with a multi-meter to yield the volume resistivity (in Ω·m) and calculated from: volume resistivity=$(R*A/L)$, where R is the electrical resistance (in Ω), A is the sample surface area, and L is the sample length (the electrical distance).

In an embodiment, a heat sink system can comprise: an integrally formed plastic heat sink and printed circuit board package, wherein the plastic heat sink comprises a thermally conductive plastic having a thermal conductivity of at least 1.0 W/mK.

In an embodiment, a light comprises: a housing, a heat sink system comprising a printed circuit board package and a plastic heat sink; a reflector located in the housing in optical communication with an LED of the printed circuit board package, and a lens covering the printed circuit board package. The plastic heat sink comprises a thermally conductive plastic having a thermal conductivity of at least 1.0 W/mK.

In another embodiment, a hybrid heat sink system, comprises: an integrally formed plastic heat sink and an insert, wherein the plastic heat sink comprises a thermally conductive plastic, the plastic heat sink and the insert each having a cylindrical shape, and wherein the insert comprises a feature of lancing provisions, corrugations, embossing, holes, or a combination comprising at least one of the foregoing features.

In an embodiment, a method of making an integral hybrid heat sink system, comprising: inserting an insert into a mold; melting a thermally conductive plastic; introducing the melted thermally conductive plastic into the mold and into contact with the insert to form a plastic heat sink around the insert upon cooling; and cooling the thermally conductive plastic to form the integral hybrid heat sink system, wherein the plastic heat sink and the insert each have a cylindrical shape, and wherein the insert comprises a feature of lancing provisions, corrugations, embossing, holes, or a combination comprising at least one of the foregoing features. Optionally, the method further comprises disposing a printed circuit board package into the mold prior to introducing the melted thermally conductive plastic into the mold.

In the various embodiments, (i) the thermal conductivity of the thermally conductive plastic is 2 to 6 W/m-K; and/or (ii) the heat sink system is free of independent attachment elements that attach the printed circuit board package to the plastic heat sink; and/or (iii) the plastic heat sink has a cylindrical shape; and/or (iv) the plastic heat sink comprises radially extending fins, and wherein the printed circuit board package is located near one end of the plastic heat sink; and/or (v) the printed circuit board package further comprises a chip on board; and/or (vi) no thermal interface material is located between the printed circuit board package and the plastic heat sink; and/or (vii) the printed circuit board package is attached to the heat sink without separate attachment elements; and/or (viii) the plastic heat sink comprises: 35 vol % to 80 vol % of a thermoplastic polymer, 5 vol % to 45 vol % of a low thermal conductivity, electrically insulative filler with an intrinsic thermal conductivity of 10 W/mK to 30 W/mK, 2 vol % to 15 vol % of a high thermal conductivity, electrically insulative filler with an intrinsic thermal conductivity greater than or equal to 50 W/mK, and 2 vol % to 15 vol % of a high thermal conductivity, electrically conductive filler with an intrinsic thermal conductivity greater than or equal to 50 W/mK; and/or (ix) heat sink system further comprising an insert, wherein the plastic heat sink comprises radially extending fins, and wherein the insert comprises a feature of lancing provisions, corrugations, embossing, holes, or a combination comprising at least one of the foregoing features; and/or (x) the plastic heat sink and the insert each have a cylindrical shape; and/or (xi) the insert comprises lancing provisions and the lancing provisions comprise openings formed by protrusions extending into the insert, with the thermally conductive plastic extending into the openings; and/or (xii) the plastic heat sink comprises radially extending fins with holes located between the fins; and/or (xiii) the insert comprises holes, and wherein the insert holes align with the plastic heat sink holes; and/or (xiv) the insert comprises embossing; and/or (xv) the system further comprises an integrally formed printed circuit board package.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to differentiate one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:
1. A heat sink system, comprising:
    an integrally formed plastic heat sink, wherein the plastic heat sink comprises a thermally conductive plastic having a thermal conductivity of at least 1.0 W/mK;
    a printed circuit board package, wherein the plastic heat sink comprises radially extending fins;
    an insert located in the plastic heat sink; and
    at least one of the following features
        the plastic heat sink comprises a wall between the fins with holes through the wall;
        insert holes that align with plastic heat sink holes;
        the insert comprises embossing; and
        the insert comprises lancing provisions and the lancing provisions comprise openings formed by protrusions extending into the insert, with the thermally conductive plastic extending into the openings.
2. The heat sink system of claim 1, wherein the thermal conductivity of the thermally conductive plastic is 2 to 6 W/mK.
3. The heat sink system of claim 1, wherein the heat sink system is free of independent attachment elements that attach the printed circuit board package to the plastic heat sink.
4. The heat sink system of claim 1, wherein the printed circuit board package further comprises a chip on board.
5. The heat sink system of claim 1, wherein no thermal interface material is located between the printed circuit board package and the plastic heat sink.
6. The heat sink system of claim 1, wherein the plastic heat sink and the insert each have a cylindrical shape.
7. The heat sink system of claim 6, wherein the insert comprises the lancing provisions and the lancing provisions comprise openings formed by protrusions extending into the insert, with the thermally conductive plastic extending into the openings.
8. The heat sink system of claim 6, wherein the plastic heat sink comprises the wall between the fins with the holes through the wall.
9. The heat sink system of claim 8, wherein the insert comprises the insert holes, and wherein the insert holes align with the plastic heat sink holes.
10. The heat sink system of claim 6, wherein the insert comprises the embossing.
11. The heat sink system of claim 1, wherein the insert is metal.
12. The heat sink system of claim 1, wherein the insert is a sheet metal insert.
13. A heat sink system, comprising an integrally formed plastic heat sink and printed circuit board package;
    wherein the plastic heat sink comprises:
        35 vol % to 80 vol % of a thermoplastic polymer;
        5 vol % to 45 vol % of a low thermal conductivity, electrically insulative filler with an intrinsic thermal conductivity of 10 W/mK to 30 W/mK;
        2 vol % to 15 vol % of a high thermal conductivity, electrically insulative filler with an intrinsic thermal conductivity greater than or equal to 50 W/mK; and
        2 vol % to 15 vol % of a high thermal conductivity, electrically conductive filler with an intrinsic thermal conductivity greater than or equal to 50 W/mK.

14. A light comprising:
a housing,
a heat sink system comprising
    a printed circuit board package;
    a plastic heat sink, wherein the plastic heat sink comprises radially extending fins and wherein the plastic heat sink comprises a thermally conductive plastic having a thermal conductivity of at least 1.0 W/mK;
    an insert located in the plastic heat sink; and
    at least one of the following features
        the plastic heat sink comprises a wall between the fins with holes through the wall;
        insert holes that align with plastic heat sink holes;
        the insert comprises embossing; and
        the insert comprises lancing provisions and the lancing provisions comprise openings formed by protrusions extending into the insert, with the thermally conductive plastic extending into the openings;
a reflector located in the housing in optical communication with an LED of the printed circuit board package; and
a lens covering the printed circuit board package.

15. A heat sink system, comprising:
an integrally formed plastic heat sink and an insert, wherein the plastic heat sink comprises a thermally conductive plastic, the plastic heat sink and the insert each having a cylindrical shape, and wherein the system comprises at least one of the following features;
    the plastic heat sink comprises a wall between the fins with holes through the wall;
    insert holes that align with plastic heat sink holes;
    the insert comprises embossing; and
    the insert comprises lancing provisions and the lancing provisions comprise openings formed by protrusions extending into the insert, with the thermally conductive plastic extending into the openings.

16. The heat sink system of claim 15, wherein the insert comprises the lancing provisions and the lancing provisions comprise openings formed by protrusions extending into the insert, with the thermally conductive plastic extending into the openings.

17. The heat sink system of claim 15, wherein the plastic heat sink comprises the wall between the fins with the holes through the wall.

18. The heat sink system of claim 17, wherein the insert comprises the insert holes that align with the plastic heat sink holes.

19. The heat sink system of claim 15, wherein the insert comprises the embossing.

20. The heat sink system of claim 15, further comprising an integrally formed printed circuit board package.

21. A method of making an integral hybrid-heat sink system, comprising:
    inserting an insert into a mold;
    melting a thermally conductive plastic;
    introducing the melted thermally conductive plastic into the mold and into contact with the insert to form a plastic heat sink around the insert upon cooling; and
    cooling the thermally conductive plastic to form the integral heat sink system, wherein the plastic heat sink and the insert each have a cylindrical shape, and wherein the insert comprises at least one of the following features
        the insert comprises lancing provisions comprising openings formed by protrusions extending into the insert, with the thermally conductive plastic extending into the openings;
        the plastic heat sink comprises radially extending fins with walls between the fins and holes through the walls;
        insert holes that align with plastic heat sink holes; and
        the insert comprises embossing.

22. The method of claim 21, wherein the insert comprises the lancing provisions.

23. The method of claim 21, wherein the insert comprises the embossing.

24. The method of claim 21, wherein the plastic heat sink comprises the radially extending fins with the walls between the fins and the holes located through the walls.

25. The method of claim 21, further comprising disposing a printed circuit board package into the mold prior to introducing the melted thermally conductive plastic into the mold.

* * * * *